Patented Jan. 27, 1931

1,790,042

UNITED STATES PATENT OFFICE

OTTO EISLEB, OF HOFHEIM, GERMANY, ASSIGNOR, BY MESNE ASSIGNMENTS, TO WINTHROP CHEMICAL COMPANY, OF NEW YORK, N. Y., A CORPORATION OF NEW YORK

SUBSTITUTED 1,3-DI-AMINO-2-PROPANOLS

No Drawing. Application filed July 28, 1927, Serial No. 209,177, and in Germany August 3, 1926.

My present invention relates to new asymmetrically substituted 1.3-di-amino-2-propanols and to a process of preparing the same.

There have already for some time been known 1.3-diamino-2-propanols symmetrically substituted at the two nitrogen atoms obtainable by the reaction of dichlorhydrin or epichlorhydrin with a base and which, owing to the easy way in which they can be prepared, are utilized as parent material in the manufacture of therapeutically valuable substances. However, for the preparation of asymmetrically substituted 1.3-di-amino-2-propanols no synthesis has as yet been known.

Now I have found that the alpha-tertiary amino epihydrins, some of which have only vaguely been described in literature and have not at all been studied as regards their reactions, can be easily obtained from epichlorhydrin and secondary bases under suitable working conditions and, when subjected to reaction with a nitrogen base such as ammonia, a primary or secondary amine, yield 1.3-di-amino-2-propanols unequally substituted at both nitrogen atoms. The reaction takes place in three stages according to the following general scheme:

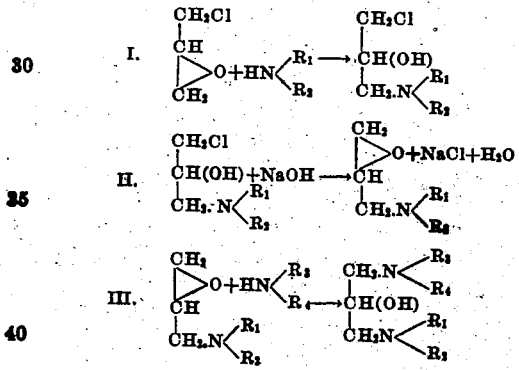

In the above formulas, $R_1$ and $R_2$ stand for alkyl or aryl, or carbon atoms belonging to a heterocyclic nitrogen containing nucleus, and $R_3$ and $R_4$ stand for hydrogen or alkyl. In this manner compounds can be obtained one amino group of which is a tertiary one, the other amino group being either a tertiary one which is different from the former, or a secondary or primary one. The asymmetrically substituted 1.3-di-amino-2-propanols are intended to be used as intermediate products in the manufacture of therapeutic agents. They can be represented by the general formula:

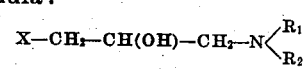

wherein N is a nitrogen of a tertiary amine; $R_1$ and $R_2$ standing for alkyl, aryl or carbon atoms, belonging to a heterocyclic nitrogen containing nucleus, and X represents a primary, secondary or tertiary amino-group, being linked to the $CH_2$ group by means of its nitrogen atom.

The following examples serve to illustrate my invention but they are not intended to limit it thereto, the parts being all parts by weight:

1. *Preparation of 1-amino-3-diethylamino-2-propanol and alpha-diethylamino-epihydrin.*—463 parts of epichlorhydrin, 10 parts of water and 300 parts of diethylamine are mixed, while stirring and cooling. There is a gradual self-heating of the mixture. This self-heating is counter-acted by cooling in a suitable manner to such an extent that the temperature of the mixture remains between 28° C. and 30° C. When, after about 2 hours, the heat evolved during the reaction has abated, the mixture is kept for another 2 to 3 hours at 28° C. to 30° C. by a suitable external heating. The product of the reaction is then shaken out with 500 parts by volume of a 20% solution of potassium carbonate and after the latter has been separated, the product is again well shaken with 600 parts by volume of caustic soda solution of 40° Bé. for 45–60 minutes during which operation sodium chloride separates with slight selfheating. The very mobile layer consisting of crude diethylamino-epihydrin is separated from the salt solution, well shaken for a short time with a caustic potash solution of 50% strength and after isolation distilled in a vacuum. The product, which runs over at 40° C. to 50° C. under 8 mm. pressure is collected, its boiling point under 760 mm. pressure being 155° C. to 159° C. It is a colorless very mobile liquid of an intensely basic smell which is miscible with water and can be re-separated from its aqueous solution by means of a caustic soda solution. On storing the substance for a considerable time, it gradually undergoes some change in that a viscous oil separates. 60 parts of diethylamino-epihydrin are rapidly heated with 850 parts of methyl alcoholic ammonia of 20% strength in a pressure vessel to 100° C. and the mass is maintained at this temperature for 30 minutes. After cooling and distilling off the methyl alcohol under ordinary pressure, the remaining mass is subjected to fractional distillation under reduced pressure whereby a main fraction is obtained at 120° C. to 130° C. under 30 mm. pressure. The 1-amino-3-di-ethylamino-2-propanol of the probable formula:

NH₂.CH₂.CH(OH).CH₂.N(C₂H₅)₂ boils at 223° C. under 760 mm. pressure and is a colorless oil of a slightly basic smell, miscible with water with selfheating (formation of a hydrate) and also miscible in ether; it can be salted out from an aqueous solution by means of potassium carbonate.

2. *Preparation of 1-ethylamino-3-diethylamino-2-propanol.*—130 parts of diethylamino-epihydrin are heated in a bomb for one hour to 120° C. to 130° C. with 500 parts of an alcoholic solution of ethylamine of about 47% strength. After cooling, the mass is subjected to fractional distillation first under ordinary and then under reduced pressure. Thus, a fractional distillate is obtained which distils over between 100° C. to 120° C. under 6 mm. pressure. Under normal pressure, the product boils at between 230° C. to 232° C. It is a colorless oil of a weak smell and has the probable formula:

C₂H₅.NH.CH₂.CH(OH).CH₂.N(C₂H₅)₂

3. *Preparation of 1-amino-3-piperidino-2-propanol and piperidinoepihydrin.*—Into 100 parts of epichlorhydrin are introduced drop by drop 98 parts of piperidine at a temperature of 28° C. to 30° C. while stirring and cooling in a suitable manner. The heat evolved during the reaction is very considerable. After one to one and a half hours the heat has entirely abated. The mixture is allowed to stand for a further three hours and then first shaken out with a 20% solution of potassium carbonate and then again with 150 parts by volume of a caustic soda solution of 40° Bé. for one hour. The thin liquid oil layer is separated, dried over potassium hydroxide and distilled in a vacuum. It distils over at 72° C. to 77° C. under 8 mm. pressure. 100 parts of piperidinoepihydrin thus obtained are heated in a bomb to 100° C. with a solution of 280 parts of ammonia in 1500 parts of methyl alcohol and kept at this temperature for 30 minutes. By fractional distillation the 1-amino-3-piperidino-2-propanol of the probable formula:

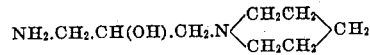

is obtained as a colorless liquid slightly smelling like alkamine; it distils over at 148° to 150° C. under a pressure of 29 mm. This product soon solidifies entirely into a mass composed of radiated crystals.

4. *Preparation of 1-amino-3-(phenylmethyl-amino)-2-propanol and alpha-phenylmethylamino-epihydrin.*—318 parts of monomethylaniline, 300 parts of methyl alcohol and 300 parts of epichlorhydrin are gently heated together in a flask on the water-bath and under reflux cooling. The mass soon begins to boil which continues for about one hour after stopping the supply of heat. The mixture is then boiled for another 6 hours in the reflux apparatus, at the end of which time all epichlorhydrin has been transformed as is shown by the fact that a test sample gives a clear solution in diluted sulfuric acid. After the ethyl alcohol has been distilled off in a vacuum at 60° C., the residue is mixed and stirred for 2 hours with 450 parts by volume of caustic soda solution of 40° Bé., the oil separated, once well shaken with a caustic potash solution of 50% strength, again separated and distilled in a vacuum; the product distils over at 132° C. to 135° C. under 8 mm. pressure, or at 160° C. to 162° C. under 30 mm. pressure. The product is an oil, smelling, but very slightly, like dimethylaniline, being almost colorless, dissolving very sparingly in water and having the probable formula:

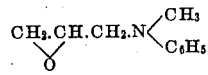

135 parts of the phenylmethylamino-epihydrin so obtained are heated in a bomb to 100° C. with a solution of 250 parts of ammonia in 1500 parts of methyl alcohol and the mixture is kept at this temperature for 2 hours. The new base separated by the fractional distillation forms a thick oil of a very faint-yellowish color; it distils over at 205° C. to 210° C. under 30 mm. pressure. On standing this oil soon solidifies into a homogeneous colorless crystalline mass, melting at 71° C. It has the probable formula:

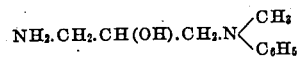

I claim:
1. As new products the compounds of the general formula:

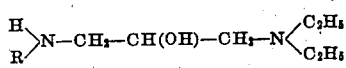

wherein R represents hydrogen or alkyl.
2. As a new product, the compound of the general formula:

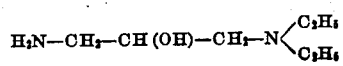

being a colorless oil boiling under a pressure of 760 mm. at 223° C., having a slightly basic smell and being miscible with water.

3. The process which comprises causing a secondary base to react with epichlorhydrin in monomolecular proportions, treating the intermediate product thus obtained with caustic alkali, and then treating the resulting compound with a nitrogen base containing at least one hydrogen atom linked to the nitrogen.

4. The process which comprises causing diethylamine to react with epichlorhydrin in monomolecular proportions, treating the intermediate product thus obtained with caustic alkali, and then treating the resulting compound with a nitrogen base containing at least one hydrogen atom linked to the nitrogen.

5. The process which comprises causing a secondary base to react with epichlorhydrin in monomolecular proportions, treating the intermediate product thus obtained with caustic alkali and then treating the resulting compound with ammonia.

6. The process which comprises causing diethylamine to react with epichlorhydrin in monomolecular proportions, treating the intermediate product thus obtained with caustic alkali and then treating the resulting compound with ammonia.

7. The process which comprises causing a secondary base to react with epichlorhydrin in monomolecular proportions, treating the intermediate product thus obtained with caustic alkali, and then treating the resulting compound with methyl-alcoholic ammonia.

8. The process which comprises causing diethylamine to react with epichlorhydrin in monomolecular proportions, treating the intermediate product thus obtained with caustic alkali, and then treating the resulting compound with methyl-alcoholic ammonia.

9. As new products the compounds of the general formula:

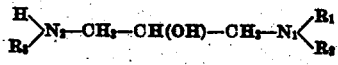

wherein $N_1$ is a nitrogen of a tertiary amine; $R_1$ and $R_2$ standing for alkyl, aryl or carbon atoms belonging to a heterocyclic nitrogen containing nucleus, and $R_3$ represents hydrogen or alkyl.

In testimony whereof, I affix my signature.

OTTO EISLEB.